(12) United States Patent
Eubanks et al.

(10) Patent No.: US 7,669,391 B2
(45) Date of Patent: Mar. 2, 2010

(54) MOWING IMPLEMENT ROTARY DISC CUTTER BAR USED TOGETHER WITH A CROP-LIFTING ARRANGEMENT

(75) Inventors: Jason Chad Eubanks, Ottumwa, IA (US); Roger William Frimml, Ottumwa, IA (US); Daniel James Meyer, Ottumwa, IA (US); Allan Wesley Rosenbalm, Ottumwa, IA (US); Matt Jay Scott, Ottumwa, IA (US)

(73) Assignee: Deere & Company, Moline, IL (US)

( * ) Notice: Subject to any disclaimer, the term of this patent is extended or adjusted under 35 U.S.C. 154(b) by 1704 days.

(21) Appl. No.: 10/736,465

(22) Filed: Dec. 15, 2003

(65) Prior Publication Data
US 2005/0126141 A1 Jun. 16, 2005

(51) Int. Cl.
*A01D 75/30* (2006.01)
(52) U.S. Cl. .............................. 56/6; 56/157
(58) Field of Classification Search ........ 56/6, 56/51, 16.4 R, 16.5, 16.6, 16.4 A, 16.4 B, 56/13.8, 13.9, 157
See application file for complete search history.

(56) References Cited

U.S. PATENT DOCUMENTS

| | | | | |
|---|---|---|---|---|
| 3,673,779 A | * | 7/1972 | Scarnato et al. ............... | 56/503 |
| 4,145,865 A | * | 3/1979 | Werner ....................... | 56/14.4 |
| 4,330,982 A | | 5/1982 | Vissers et al. .................... | 56/6 |
| 4,348,857 A | * | 9/1982 | Berlivet et al. ................ | 56/192 |
| 4,549,390 A | | 10/1985 | McLean ..................... | 56/13.6 |
| 6,158,201 A | | 12/2000 | Pruitt et al. ...................... | 56/6 |
| 6,581,362 B2 | * | 6/2003 | Rosenbalm et al. .............. | 56/6 |

* cited by examiner

*Primary Examiner*—Alicia M Torres

(57) ABSTRACT

A mower-conditioner implement is equipped with a rotary disc cutter bar and associated with the cutter bar are a plurality of crop-lifting units that cooperate to define an upright lip that works together with transversely spaced ramp sections, of the respective lifting units, that incline downwardly to the front from transversely spaced locations along the top of the lip for lifting and directing cut crop to the conditioner. In one embodiment, the crop-lifting units are releasably coupled to the cutter bar, and, in a second embodiment, are formed integrally with the cutter bar.

10 Claims, 5 Drawing Sheets

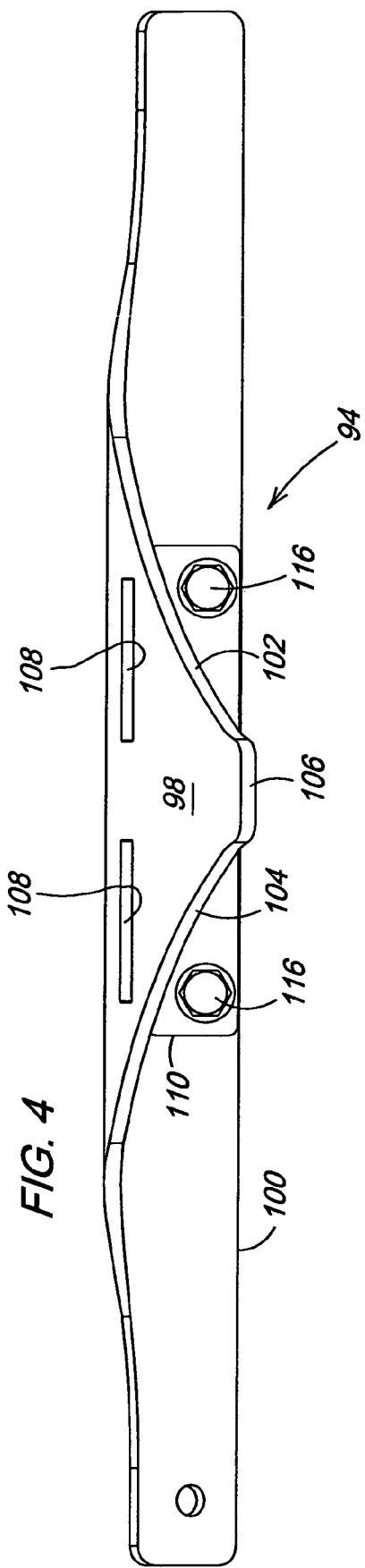
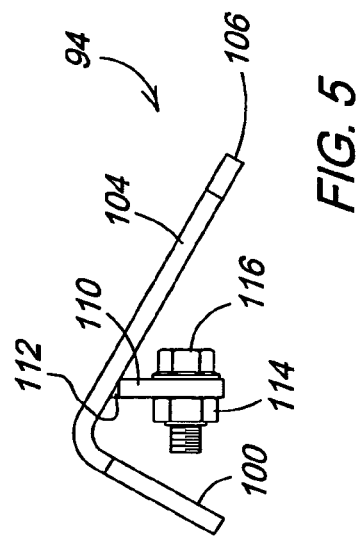
FIG. 4
FIG. 5

MOWING IMPLEMENT ROTARY DISC CUTTER BAR USED TOGETHER WITH A CROP-LIFTING ARRANGEMENT

FIELD OF THE INVENTION

The present invention relates to mowing implements, and more particularly relates to such implements as are equipped with rotary disc cutter bars and further crop processing devices located immediately behind the cutter bars for receiving crop as it passes downstream from the cutter bar.

BACKGROUND OF THE INVENTION

Feeding crop to a crop processing device located immediately behind a rotary disc cutter bar can be problematic if the crop is not delivered at an appropriate height for engagement by the crop processing device. An example of a combined mowing implement and crop processing device exhibiting the problem is a crop harvesting platform equipped with a rotary disc cutter bar that delivers crop to a crop conditioner. The problem exhibited by this arrangement is that the cut crop hesitates at the rear of the cutter bar, at a location directly forward of the conditioner. In larger stemmed crops, the stems will wedge under the conditioner causing this hesitation of crop flow.

The distance from the top of the cutter bar to the desired feeding point of various crop processing devices, such as a crop conditioner, for example, requires the crop to be lifted. The front profile of the cutter bar allows the crop to hit the crop processing device at different heights. The crop that flows over the cutter discs engages the processing device at a higher height than does the crop that flows between the cutter discs.

It is known in the art to provide powered elements such as augers or feeder rolls to aid in feeding the crop, such devices being respectively disclosed in U.S. Pat. Nos. 4,330,982 and 6,158,201, for example. Also, it is known to provide a large lifter plate on top of certain ones of the cutter discs to aid in lifting the crop for engagement by a crop processing device in the form of a crop conditioner, such a device being disclosed in U.S. Pat. No. 4,549,390, for example.

SUMMARY OF THE INVENTION

According to the present invention there is provided an improved crop-lifting arrangement associated with a rotary disc cutter bar.

An object of the invention is to provide a simple, effective crop-lifting arrangement associated with a rotary disc cutter bar for positioning the crop at a favorable height for engagement by a crop processing device positioned immediately behind or downstream from the rotary disc cutter bar.

A more specific object of the invention is to provide a crop-lifting arrangement which does not include any moving parts.

These objects are achieved, in accordance with a first embodiment, by mounting a deflector lip across the rear of the cutter bar, that serves as an element for elevating the crop, and by mounting ramps which extend forward and downward from the lip to the top of the cutter bar at locations between adjacent rotary discs and thereby serve collectively as another element for elevating the crop. In a second embodiment, the lip and ramps are formed integrally with the casting which forms the rotary disc cutter bar gear housing. Of course the lip and ramps could be cast separate from, and then bolted onto the cutter bar housing, and could be made in sections respectively associated with the plurality of modules or could be formed and attached as one complete unit, with the lip spanning the conditioner opening.

These and other objects will become apparent from a reading of the ensuing description together with the appended drawings.

BRIEF DESCRIPTION OF THE DRAWINGS

FIG. 4 is a front view of one of the segments of the crop-lifting arrangement.

FIG. 5 is an end view of the crop-lifting arrangement segment of FIG. 3.

DESCRIPTION OF THE PREFERRED EMBODIMENT

Figure 1:
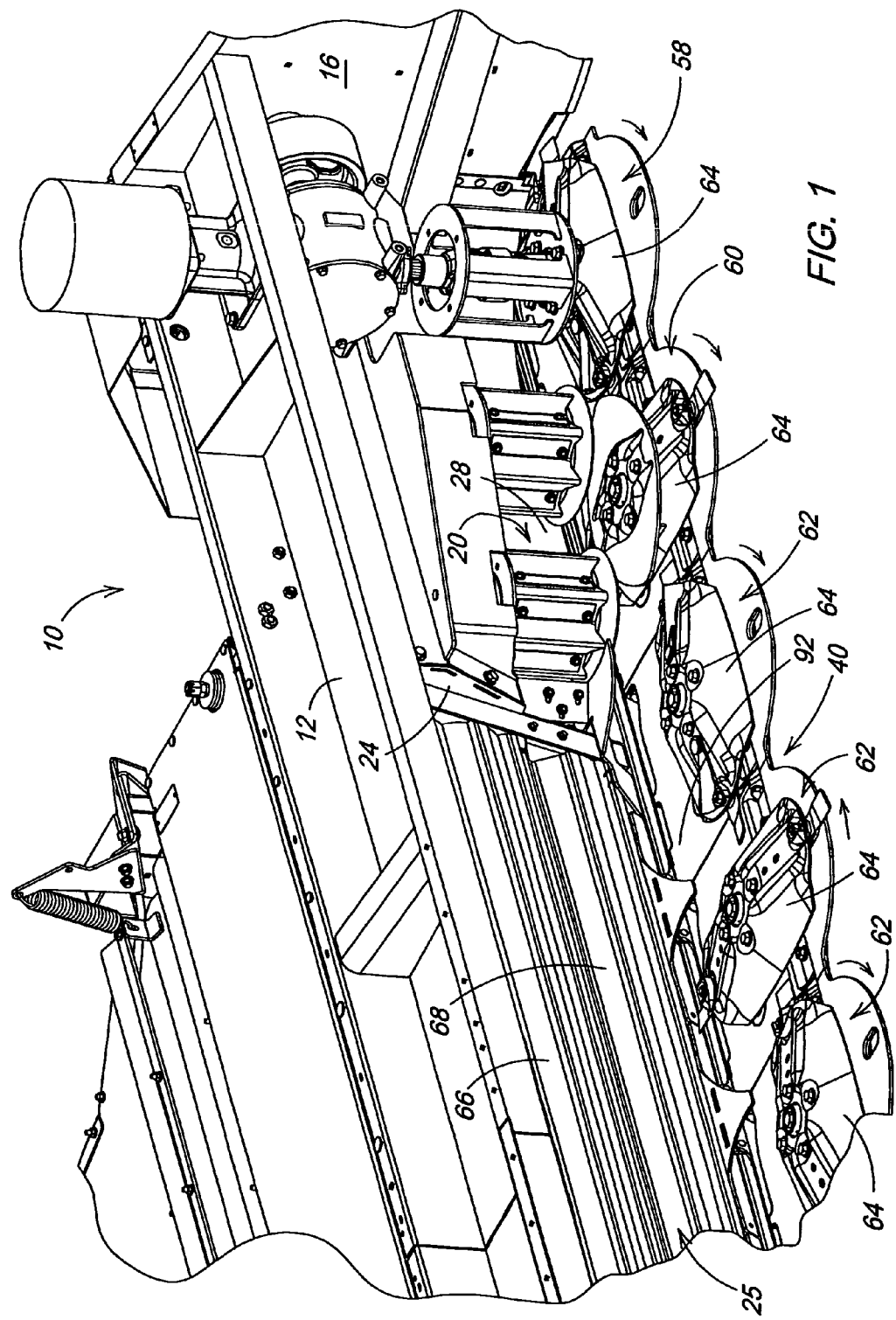
FIG. 1 is a somewhat schematic, top front perspective view including a left-hand side portion of a mower-conditioner implement equipped with a rotary disc cutter bar and a stationary crop-lifting arrangement, constructed in accordance with the present invention, for directing crop into the conditioner.
Figure 2:
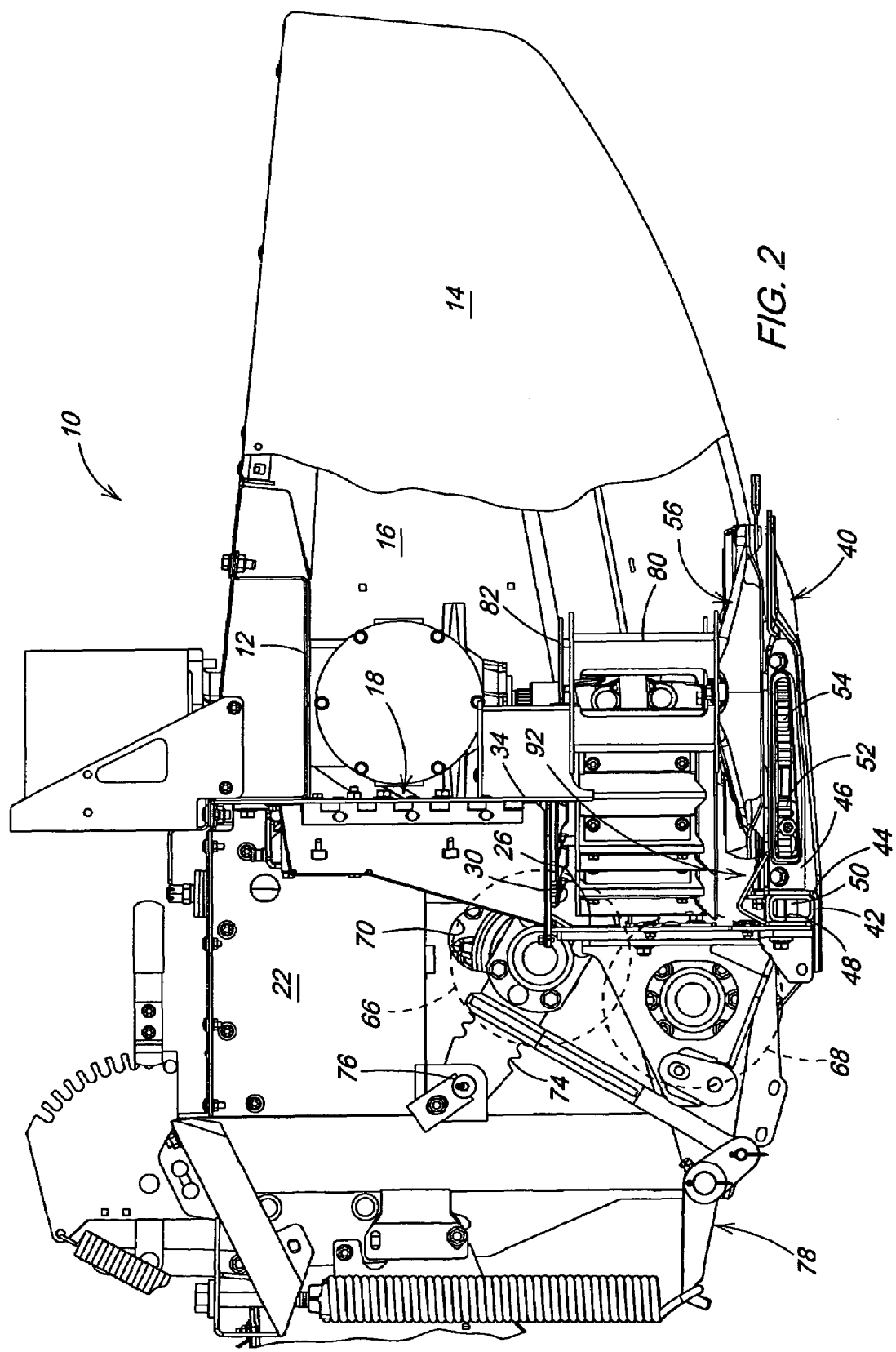
FIG. 2 is a right side view, with parts broken away for clarity, of the mower-conditioner implement of FIG. 1.
Figure 3:
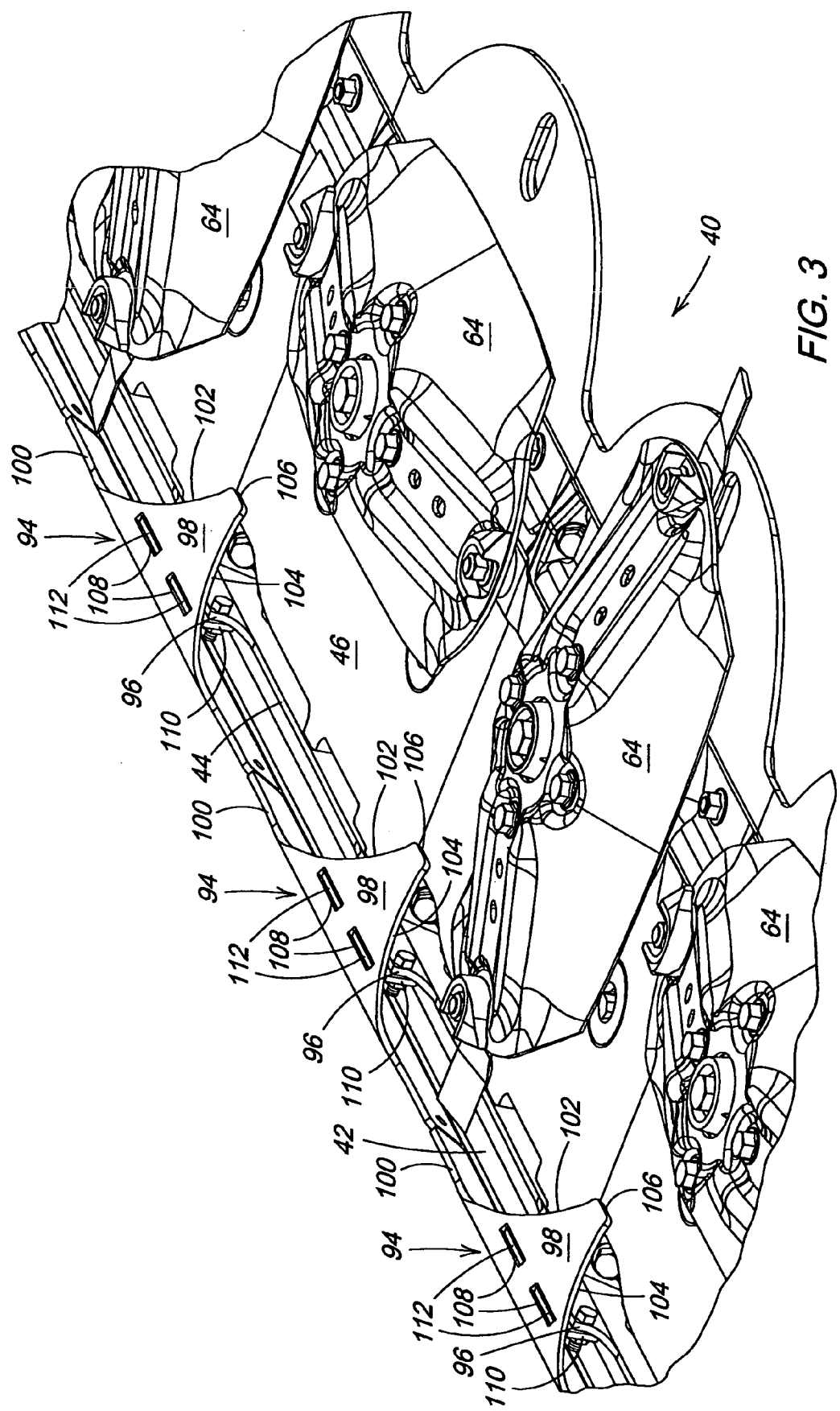
FIG. 3 is an enlarged top front perspective view of a central portion of the cutter bar showing the associated crop-lifting arrangement.

Referring now to FIGS. 1 and 2, there is shown a portion of a mower-conditioner platform 10 including a trough-shaped top frame member 12 extending between right- and left-hand outer side walls 14 and 16. Right- and left-hand upright transverse walls or bulkheads 18 and 20, respectively, extend inwardly from the side walls 14 and 16 and terminate at the forward ends of right- and left-hand, inner side walls 22 and 24, which define the opposite sides of a crop discharge zone or passage located centrally in the platform 10 and across which extends a crop conditioner arrangement 25. While the walls or bulkheads 18 and 20 could be a variety of upright configurations, they are here shown as including respective vertical lower sections 26 and 28, respective horizontal middle sections, with only the right-hand middle section 30 being visible, and respective vertical upper sections, with only the right-hand vertical section 34 being visible.

An elongate rotary disc cutter bar 40 extends between the outer side walls 14 and 16, and relative to the flow of crop through the platform 10, is just upstream, of the crop conditioner arrangement 25, in a perpendicular transverse relationship to a longitudinal center plane of the platform 10 extending along a path of travel of the platform during mowing operation. Extending the length of, and behind, the cutter bar 40 is a stiffener beam 42 of rectangular cross section. Coextensive with the stiffener beam 42 is a first mounting member 44, which is L-shaped in cross section and having a short, upright leg sandwiched between the front side of the beam 42 and a rear surface of a gear housing 46 of the cutter bar 40, and having a long leg extending beneath and projecting rearward beyond a bottom surface of the beam 42. A second mounting member 48, which is L-shaped in cross section, has an upright first leg sandwiched between a rear surface of the beam 42 and the bulkhead lower vertical sections 26 and 28. A plurality of transversely spaced stud bolts 50 extend through aligned holes provided in the bulkhead sections 26 and 28, the upright leg of the mounting member 48, the beam 42, and the upright leg of the mounting member 44 and are screwed into respective threaded holes provided in the gear housing 46.

While the present invention could be advantageously applied to rotary cutter bars of various constructions, the cutter bar 40 is a known type containing a plurality of intermeshed spur gears including a plurality of idler gears 52 (only one is shown) meshed with each other and arranged in transverse alignment over the length of the cutter bar 40, with selected ones of the idler gears 52 being meshed with drive gears 54 (only one is shown) respectively associated, one each, with a plurality of cutting units spaced along the cutter bar 40. For details of the gear housing 46 and gearing of the cutter bar 40, reference may be had to U.S. Pat. No. 5,964,079, granted to Mellin et al. on 12 Oct. 1999, which is incorporated herein in its entirety by reference.

Respectively located outboard of the right- and left-hand inner walls 22 and 24, are right-hand outer and inner cutting units, with only the right-hand outer cutting unit 56 being shown, and left-hand outer and inner cutting units 58 and 60, respectively.

Located directly in front of the discharge passage defined by the right- and left-hand inner side walls 22 and 24, respectively, and hence, directly upstream of the conditioner arrangement 25, are a plurality of central cutting units 62.

The cutting units 56-62 each include a cutting disc 64 coupled to an upright drive shaft to which power is coupled for causing them to rotate in appropriate directions, as indicated by respective arrows, for delivering crop to the conditioner arrangement 25 extending across the discharge passage.

The conditioner arrangement 25 includes upper and lower conditioner rolls 66 and 68, respectively, and each conditioner roll includes a central cylindrical drum to which is attached a plurality of axially extending ribs or flutes that mesh together for conditioning crop that passes between them. The upper conditioner roll 66 has stub shafts at its opposite ends which extend through respective openings 70, provided in the inner side walls 22 and 24, and are received in bearings carried by a pair of arms 74 respectively mounted to the side walls 22 and 24 for pivoting vertically about a pin 76. Mounted between each arm 74 and a fixed point on the platform 10 is a spring-biased link assembly 78 that yieldably resists upward movement of the upper conditioner roll 66 caused by crop passing between the conditioner rolls 66 and 68.

Provided for augmenting the rotating cutter discs 64 in conveying cut crop into the discharge passage for further processing by the conditioner rolls 66 and 68 are right- and left-hand converging drum sets, which respectively include outer or end converging drums 80 and 82, intermediate converging drums 84 and 86, and inner converging drums 88 and 90. The end converging drums 80 and 82 are respectively mounted for rotation with the end cutting units 56 and 58. As can be seen in FIGS. 1 and 2, the intermediate converging drums 84 and 86 are set back from a line of centers passing through the centers of rotation of the cutting discs 64, and the inner converging drums 88 and 90 are set back relative to the intermediate converging drums 84 and 86.

The structure described up to this point is similar to that disclosed in U.S. Pat. No. 6,581,362, and resort may be had to this patent for a more detailed description.

The present invention resides in a crop-lifting arrangement 92 mounted to the cutter bar 40 at a location just upstream of, and for the purpose of lifting cut crop to a more favorable position for being fed into, the conditioner assembly 25, with it to be understood that the crop-lifting arrangement 92 may also find utility in implements equipped with impeller conditioners, or may find utility in other machines where a rotary cutter bar is used for delivering the cut crop directly to another type of crop feeding or conveying device located immediately downstream from the cutter bar and having a design which will result in the crop being conveyed more effectively if the crop arrives at a favorable height above the cutter bar.

Referring also to FIGS. 4 and 5, it can be seen that the crop-lifting arrangement 92 includes a plurality of lifting units 94 that are respectively mounted to a plurality of tabs 96 projecting upward from the top edge of the upright leg of the mounting member 44. The tabs 96 are each located between an adjacent pair of the cutting discs 64 of the center cutting units 62 so as to be out of the path of rotation of the cutting knives carried by the cutting discs 64.

Each of the lifting units 94 is made from sheet metal, and as viewed from the front (FIG. 4), includes a central, generally triangular ramp 98, joined to and bent at, a right-angle to a generally elongate, rectangular lip section 100. Opposite sides 102 and 104 are respectively curved at a radius, about the respective axes of rotation of adjacent ones of the cutting discs 64, with the radius being slightly larger than that of the distance from the axis to a tip of one of the cutting disc knives. The opposite sides 102 and 104 converge forward to a nose 106 which engages a planar top location of the gear housing 46, which location is approximately equidistant from the axes of rotation of adjacent ones of the cutting discs 64. Located in the ramp 98 just forward of its juncture with the lip section 100 are a pair of spaced narrow openings 108. A vertical mounting plate 110 has a pair spaced tabs 112 located along its upper edge and respectively welded within the narrow openings 108 in the ramp 98. The mounting plate 110 of each deflector unit 94 is provided with a pair of mounting holes, and a pair of nuts 114 are respectively welded to the back side of the mounting plate 110 in alignment with the pair of holes. The pair of holes in each of the mounting plates 110 are respectively aligned with a pair of mounting holes provided in a respective one of the tabs 96 of the mounting plate 44, and bolts 116 (shown stored with the lifting unit 94 in FIGS. 4 and 5) are respectively received in the aligned set of holes and screwed into respective nuts 114 so as to secure the associated lifting unit 94 in place. It is noted that the lip sections 100 of the deflector units abut end-to-end across the rear of the cutter bar 40 and in that way define an upright lip that extends approximately the entire width of the discharge passage defined between the inner side walls 22 and 24 of the implement 10.

During mowing operation, cut crop carried to the rear by the cutting discs 64 of the inner and central cutting units 60 and 62, respectively, will be prevented from feeding below and becoming wedged below the conditioner arrangement 25 by the crop-lifting arrangement 92. Specifically, as crop is conveyed across the cutter bar 40 towards the conditioner arrangement 25, it travels over the top, as well as between, the discs 64. The crop that travels in between adjacent discs 64, of those cutting units 62 that are directly forward of the conditioner rolls 66 and 68, engages the ramp 98 located there, the ramps 98 acting to lift the crop up to a favorable height for being engaged by, and fed between the conditioner rolls 66 and 68 of, the conditioner arrangement 25. Crop that is traveling in the vicinity of the lip sections 100 at locations beside the ramps 98 is caused to be lifted over the lip sections 100 so that this crop too is lifted to the favorable height. Thus, the combination of the lip sections 100 and ramps 98 of the crop-lifting units 94 acts to improve crop flow so that the flow is uniform, i.e., there is no hesitation in the crop flow. This results in increased machine productivity, and less power consumption, the latter being due to a decrease in crop being re-cut before it passes to the conditioner assembly 25.

While the preferred embodiment discloses the individual crop-lifting units 94 which cooperate to form a continuous lip in front of the conditioner assembly 25 and to have the ramps 98 integral with the lip sections 100, it is to be understood that a one-piece continuous lip could be constructed separate from, or together with, the ramps.

Figure 6:
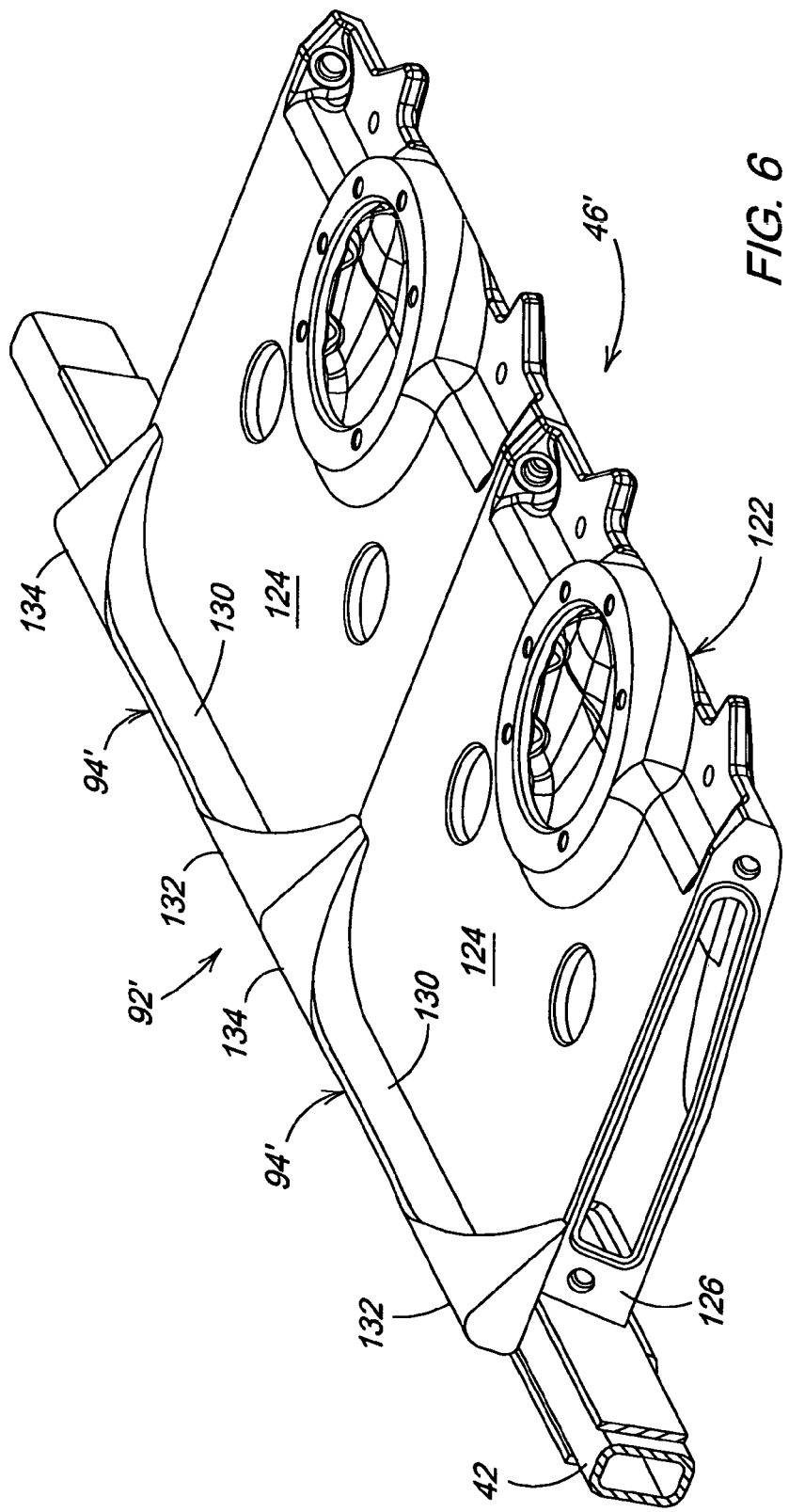
FIG. 6 is a right front perspective view of a second embodiment of the invention wherein the crop-lifting arrangement is formed as an integral part of the castings which make up the gear housing of the rotary disc cutter bar.

Referring now to FIG. 6, there is shown an alternate embodiment of the invention. Specifically, there is shown a portion of a cutter bar 46' including a gear housing 122 constructed of plurality of separate cast modules 124, each having parallel, inclined sidewalls 126, with one sidewall carrying an o-ring seal within a groove and the other sidewall being flat so that when the sidewalls of adjacent modules 124 are bolted together the seal prevents leakage of lubrication fluid that is contained within the housing 122. Formed integrally with the housing 122 is a crop-lifting arrangement 92'. The crop-lifting arrangement 92' is comprised of a plurality of crop-lifting units 94' respectively formed integrally with the modules 124. Specifically, each crop lifting unit 94' includes an upright lip segment 130 having its opposite ends joined to right- and left-hand, half ramp segments 132 and 134, respectively, with the ramp segments 132 and 134 of adjacent modules 124 cooperating with each other to form a complete ramp.

Thus, it will be appreciated that the lip segments 130 and the ramp segments 132 and 134 cooperate to form the crop-lifting arrangement 92', which operates so as to lift crop in the same manner as the crop-lifting arrangement 92.

Having described the preferred embodiment, it will become apparent that various modifications can be made without departing from the scope of the invention as defined in the accompanying claims.

The invention claimed is:

1. In combination with a mowing implement equipped with a rotary disc cutter bar having a gear housing extending transversely, relative to a forward direction of travel during mowing operation, and including a plurality of transversely spaced, knife-carrying rotary discs mounted, and being respectively driven, for rotating in desired directions above an upper surface of said gear housing for cutting and delivering crop into a discharge zone at the rear of the cutter bar, a crop processing device located in said discharge zone just downstream from said cutter bar, and a crop-lifting arrangement for directing cut crop delivered by said rotary discs upwardly and rearwardly from said cutter bar so as to be in a favorable location for engagement by said crop processing device, the improvement comprising: said crop-lifting arrangement including a lip extending transversely across, and projecting substantially upright from, at least a rear region of said cutter bar located just forward of said crop processing device; and said lip extending closely adjacent to, and to a height above, a path traced by knives of said knife-carrying rotary discs.

2. The combination, as defined in claim 1, wherein said crop-lifting arrangement further includes a plurality of ramps, respectively positioned at locations between adjacent rotary discs and inclined downwardly and forwardly from a top of said lip to said upper surface of said housing.

3. The combination, as defined in claim 2, wherein said crop-lifting arrangement comprises a plurality of individual lifter units; each lifter unit including a lip section joined to a respective one of said plurality of ramps; and said lip sections cooperating to define said lip.

4. The combination, as defined in claim 3, wherein said gear housing includes an upright rear surface; an elongate mounting member extending lengthwise of said cutter bar and being fixed to said rear surface of said gear housing; and said individual lifter units being secured to said mounting member.

5. The combination, as defined in claim 4, wherein each ramp of each individual lifter unit has a vertical, transverse mounting plate fixed to an underside thereof; and each mounting plate being fastened to said mounting member.

6. The combination, as defined in claim 3, wherein said ramp and lip section of each individual lifter unit make an angle of approximately 90° with each other.

7. The combination, as defined in claim 1, wherein said lip is inclined upwardly and forwardly at an angle of approximately 60° to the horizontal.

8. The combination, as defined in claim 1 wherein said lip is formed integrally with said gear housing.

9. The combination, as defined in claim 8, wherein said crop-lifting arrangement further includes a plurality of ramps formed integrally with said gear housing and inclined downwardly and forwardly to said upper surface of said gear housing from respective locations between adjacent gears.

10. The combination, as defined in claim 9, wherein said gear housing is constructed of a plurality of individual modules having opposite sides, with one side of one module being joined to one side of an adjacent module; and said crop-lifting arrangement being defined by individual lifting units respectively joined to upper rear regions of each of said individual modules; and each of said individual lifting units being defined by a lip section extending between a pair of ramp half sections, whereby ramp half sections of adjacent modules cooperate to define a whole ramp.

* * * * *